[11] 3,581,308

| | | |
|---|---|---|
| [72] | Inventor | Joseph T. McNaney<br>8548 Boulder Drive, La Mesa, Calif. 92041 |
| [21] | Appl. No. | 815,374 |
| [22] | Filed | Apr. 11, 1969 |
| [45] | Patented | May 25, 1971 |

[54] LIGHT GUIDE CHARACTER FORMING MASK AND DISPLAY DEVICE CONTROL ELEMENT
7 Claims, 11 Drawing Figs.

[52] U.S. Cl. .................................................. 340/380, 340/336
[51] Int. Cl. ..................................................... G08b 5/00, G09f 9/30
[50] Field of Search ............................................. 340/380, 336, 324

[56] References Cited
UNITED STATES PATENTS

| | | | |
|---|---|---|---|
| 3,174,144 | 3/1965 | O'Neill .......................... | 340/380 |
| 3,506,836 | 4/1970 | Rueger .......................... | 340/380 |

*Primary Examiner*—Richard Murray

ABSTRACT: The specification discloses a light guide character forming mask assembly, including means for fashioning such assemblies, and means for utilizing the assembly as a character forming and light control element in various types of light emitting and light gate display devices.

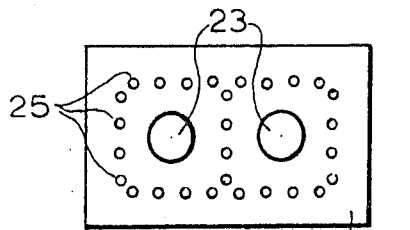
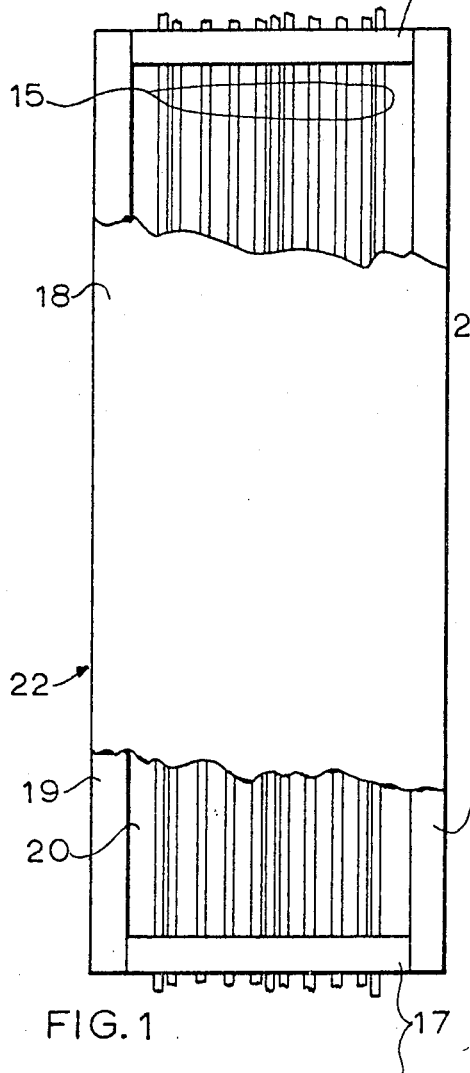
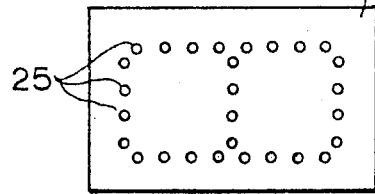
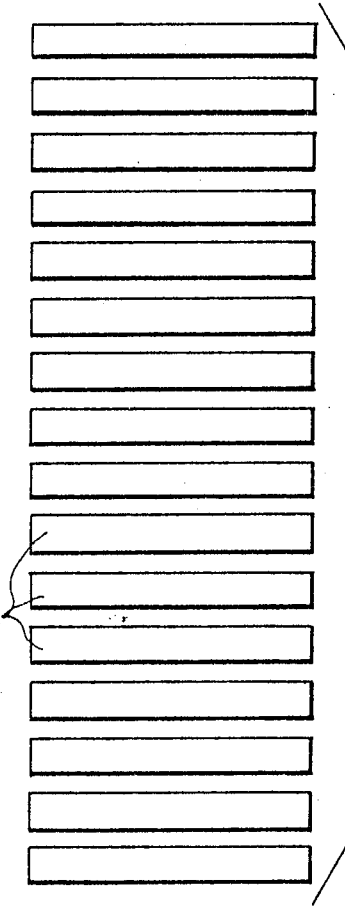
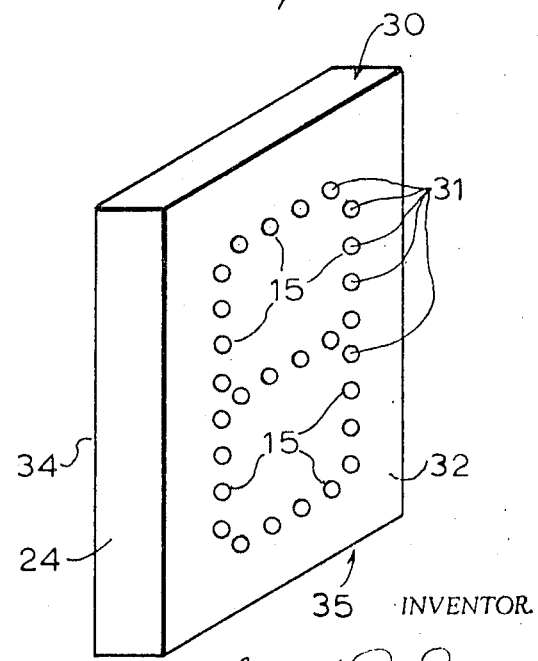
INVENTOR.
Joseph H. McHaney

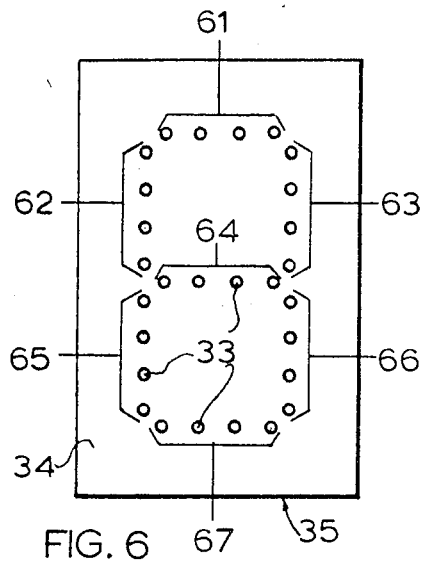
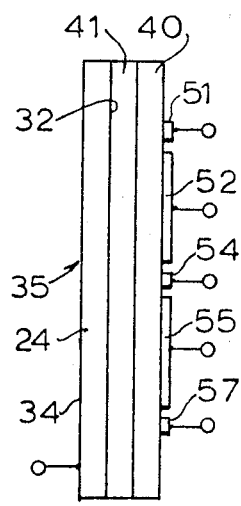
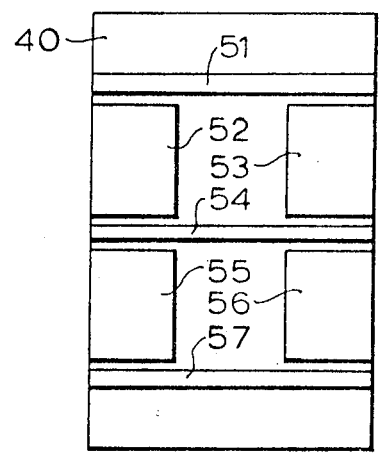
FIG. 6  FIG. 8  FIG. 7
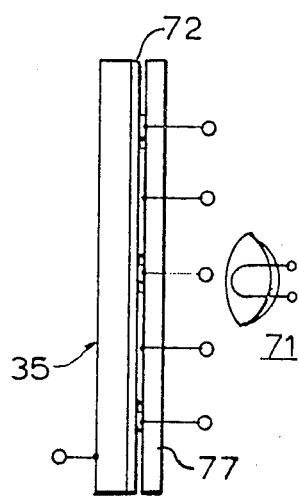
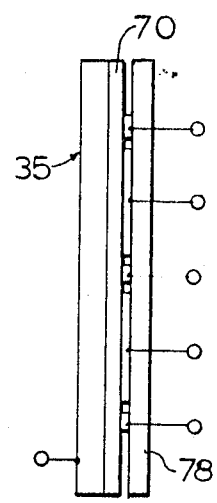
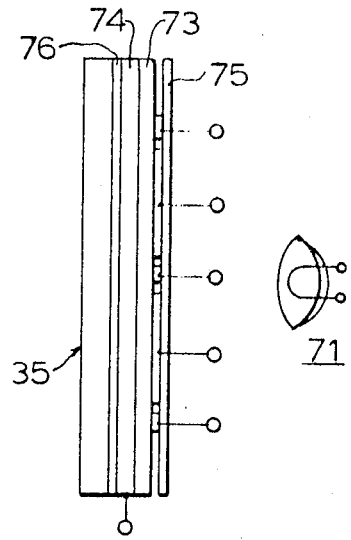
FIG. 10  FIG. 9  FIG. 11
INVENTOR.
Joseph T. McNaney

LIGHT GUIDE CHARACTER FORMING MASK AND DISPLAY DEVICE CONTROL ELEMENT

BACKGROUND OF THE INVENTION

The invention pertains to character forming mask means which utilizes a collimated array of light guides representing a plurality of character forming segments of predetermined message characters. The bonding agent or moulding compound used to fixedly supporting the array of light guides in predetermined positions may be an electrically conductive material capable of functioning as an electrode in a display device as well as a character forming mask. Included among the display means in which this mask is importantly useful include PN junction light emitting diodes, electroluminescent phosphors, birefringent ferroelectric ceramic layers and mixed nematic-cholestric liquid crystal light control materials. In devices designed around the use of these elements or materials the mask of this invention functions as a character forming and voltage terminal means of such devices.

SUMMARY OF THE INVENTION

The present invention is designed to provide character forming masks which enhance the information display capabilities of devices primarily useful in presenting message characters composed of a limited number of character forming segments. Devices used to display the numerals 0 through 9 usually employ seven bar-segments, however, in a great many instances numerals composed of well defined arrays of dots of light are preferred over numerals composed of bar-segments. Moreover, these illuminated bars of light emitting, or light transmissive, material are viewed through a transparent conductor of electrical current, or around such other electrical conductor means, which tend to affect the clarity of the information being presented.

It is therefore an object of the present invention to convert an otherwise poorly defined source of light into a plurality of well defined dots of light. In a seven-segment display device, therefore, seven such sources of light will be converted to seven segments of light and each segment will comprise a certain number of light emitting ends of light guides.

Since the light emitting ends of the invention herein are coincident with the information viewing surface thereof, photographic recordings therefrom may be made in direct contact with the viewing surface. It is a further object of this invention to utilize it as a direct contact printer of alphanumeric data.

In utilizing the invention in direct contact printing of alphanumeric data, wherein a reasonable number of characters per line are to be recorded essentially simultaneously, a further object of this invention is to provide a complete set of identical light guide assemblies, including means for fabricating identical assemblies that may be supported side-by-side in such a printer.

A further object is to include an electrically conductive material in the compound for forming the light guide assemblies of this invention in order to simplify its utilization in combination with light emitting, or light transmissive, element control means.

Other objects of the invention will best be understood from the following description when read in view of the following drawings.

BRIEF DESCRIPTION OF DRAWINGS

FIG. 1 illustrates means for embedding an array of light guides in a moulding compound and from which a number of substantially identical light guide assemblies will be obtained;

FIG. 2 shows a surface view of a light guide array determining means which is supported in the upper end of the form in FIG. 1;

FIG. 3 shows a surface view of a light guide array determining means which is supported in the lower end of the form in FIG. 1;

FIG. 4 represents a number of individual light guide assemblies obtained from a single unit after having been formed in the mould of FIG. 1;

FIG. 5 is another view of one of the assemblies referred to in FIG. 4;

FIGS. 6 and 7 show, respectively, a light emitting surface and a surface containing an array of electrodes of a display device of this invention;

FIG. 8 represents a side view of a display device of this invention which utilizes PN junction light emitting diodes;

FIG. 9 represents a side view of a display device of this invention which includes the use of an electroluminescent phosphor;

FIGS. 10 and 11 represent, respectively, display devices of this invention which include the use of light gate means in displaying message characters at the light emitting surface of the assembly.

DESCRIPTION OF THE PREFERRED EMBODIMENTS

Referring now to the drawings, FIG. 1 represents a structure in which an array of light guides 15 are supported between first and second light guide array determining members 16 and 17. These members are also used to support four side members 18, 19, 20 and 21, thereby completing what will be referred to as a moulding form 22, having openings 23 in the upper member 16 through which a moulding compound 24 is inserted. Before such compound is inserted the array of light guides is installed between the members 16 and 17. The light guides of the array 15 are inserted in each of the holes 25 of the two members, drawn taut between these members and tightly secured in the holes 25 by a cement means, for example. The array of holes 25 in the respective members have been made therein so that the light guides extending between them are therefore parallel. After the moulding compound has been inserted and allowed to harden the side members 18, 19, 20 and 21 are removed, and the moulded array of light guides is divided, by sawing for example, into a number of slabs as illustrated in FIG. 4, so as to provide a desired number of substantially identical light guide assemblies 30; one of which is again illustrated in FIG. 5.

Individual light guides of the array 15, and being referred to herein, may be made of a number of different light conducting materials, such as glass, or plastic, having a light conducting core surrounded by a light conducting jacket having a lower index of refraction than the core material. The moulding compound I use for providing the light guide assemblies of this invention will be of a material such as those used quite widely in the plastic parts industry, and wherein such materials may be in the form of good electrical insulators, or, good electrical conductors.

The light guide assembly shown in FIG. 5 has been designed to include an array of individual light guides presenting light admitting ends 31 coincident with a first surface 32, and light emitting ends 33 (shown in FIG. 6) coincident with a second surface 34. In accordance with the means described herein for making such assemblies, and in meeting the objectives of this invention, the first and second surfaces 32 and 34 are substantially parallel to each other and substantially perpendicular to the well collimated array of light guides therein. In the assembly illustrated I show an array of 28 light guides designed to represent seven character forming segments from which a number of different characters may be formed. The invention is not to be limited in this regard since a greater number of such segments may be utilized, 16 for example, so that still more character forming segments may be called upon to generate a very wide variety of letters and numerals. An object of the invention is to utilize light guide arrays for generating characters of very small sizes in line-at-a-time printing applications wherein the light guide diameters are but 0.001 inch on 0.003 inch center-to-center spacings, and as many as 100 such arrays are supported side-by-side in such a printer application. Therefore, it is important to the successful application of these light guide assemblies that such an array of assemblies include units all having substantially identical dimensions. Only then would it be possible to generate a straight line of equal height characters, or good quality lines of characters.

Referring now to FIGS. 6, 7 and 8, I show the light guide assembly of FIG. 5 in an embodiment of the invention which utilizes the light emitting capabilities of PN junction diode materials, such as an N-type alloy of gallium arsenide phosphide layer 40 which has been grown on a gallium arsenide substrate 41. The light admitting surface 32 of the light guide unit 35 is intimately joined to the outer surface of the layer 41 and an array of electrodes as shown in FIG. 7 is disposed upon the outer surface of the layer 40. It is preferable in this embodiment that the moulding compound 24 include an electrically conductive material whereby a voltage connected thereto will be extended to the outer surface of the layer 41. The array of electrodes on the outer surface of the layer 40 is disposed thereon so that electrodes 51, 52, 53, 54, 55, 56 and 57 are adjacent, and thereby related to, the light admitting ends of the character forming segments 61, 62, 63, 64, 65, 66 and 67 of the light guide unit 35. Voltage terminal means will then be used to apply the influence of an electrical potential between the electrically conductive material of the compound 24 and predetermined ones of the electrodes. In this manner predetermined portions of the light emitting diode materials will be excited and thereby lighted selectively, and predetermined segments of the light admitting ends 61 through 67 will be exposed selectively to such light.

In FIG. 9 another embodiment of the invention utilizes a layer 70 of electroluminescent phosphor, instead of the PN junction light emitting diode materials. The light guide unit 35 and the use of the electrodes 51 through 57 as described in connection with FIGS. 6 and 7 remaining the same.

In FIGS. 10 and 11 further embodiments of the invention include the use of electrically controlled light gate materials as the means of exposing the light admitting ends of the character forming segments 61 through 67 to light from a common light source 71. In FIG. 10 a layer 72 of light controlling material, such as a nematic-cholesteric liquid crystals, is used to either pass or block passage of light from a source 71 of ordinary light. An extremely thin layer, approximately 0.001 inch thick, will be used in place of either the PN junction light emitting diode material or the layer of electroluminescent phosphor layer described in reference to FIGS. 8 and 9. The light guide unit 35 and the use of the electrodes 51 through 57 as described in connection with FIGS. 6 and 7 remaining the same. A paper explaining the utility of these materials is set forth in the Jan. 1969 issue of Proceedings Of The IEEE, pages 34 through 38.

In FIG. 11 a layer 73, comprising a thin plate of birefringent ferroelectric ceramic, is used as the light controlling material of the invention. The use of this material as a means of controlling the passage of light in response to the influence of electrical potentials is set forth in U.S. Pat. application No. 758,958 entitled Multiremanent Ferroelectric Ceramic Optical Device, filed Sept. 11, 1968 by Cecil E. Land and Donald G. Schueler. The layer 73 has deposited thereon a light transparent electrically conducting layer 74 on the one side thereof and the electrode assembly as shown in FIG. 7 on the opposite side thereof. In operation, light from the source 71 is polarized upon the passage thereof through a polarizer 75, and then admitted through the array of electrodes 51 through 57 to the ceramic plate 73. As in the case of the embodiment of FIG. 10, the array of electrodes 51 through 57 are of a light transparent electrically conducting material. Sandwiched between the ceramic plate 73 and the light guide unit 35 there will be the conducting layer 74 and a light analyzer layer 76. When the ceramic plate 73 is exposed to the influence of electrical fields, being connected to the common electrode 74 and selectively to the array of electrodes 51 through 57, polarization effects of the plate 73 are shifted to the extent of passing light through the analyzer layer 76 and to selected light guide segments of the unit 35. The bonding material of the light guide unit 35 is preferably composed of an electrically insulating material. However, the use of the common electrode 74 and the electrodes 51 through 57 in selectively illuminating the light guide unit 35 will be the equivalent of that described in connection with FIGS. 6 and 7.

When supporting a large number of the light controlling units, as described in connection with the illustrations of FIGS. 8, 9, 10 and 11, in a straight line to meet the printer objectives of this invention such additional support means will be required as indicated in FIGS. 9 and 10. A rigid support means 78 would be used in the case of the FIG. 8 and 9 embodiments and it could be of any suitable material, not necessarily transparent to light, designed to secure a number of such units in a desired arrangement. A rigid support means 77, transparent to light, would be used in the case of the FIG. 10 and 11 embodiments. After a number of the light controlling units have been supported in a manner described, the light emitting ends of the light guides coincident with the second surface 34 of their respective assembly 35 will be ground and polished in a single operation. In doing so the smooth surface requirements of the contact printing objective of this invention will be met.

The particular embodiments of the invention described herein is illustrative only. Therefore, the invention includes such other modifications and equivalents as may be seen by those skilled in the arts, but still being within the scope of the appended claims.

I claim:

1. A light guide assembly including:
   a. a collimated array of light guides presenting light admitting ends coincident with a first surface of said assembly and light emitting ends coincident with a second surface of said assembly, said first and second surfaces being substantially parallel to each other and substantially perpendicular to said collimated array of light guides;
   b. said array of light guides presenting light emitting ends representing character forming segments of a predetermined number of message characters and each said segment includes a plurality of light guides wherein each light guide is spaced a predetermined distance from an adjacent light guide therein; and
   c. said light admitting ends and said light emitting ends each comprise alike arrays of character forming segments;
   d. said assembly contains a moulding compound for supporting said array of light guides therein and said compound being comprised of an electrically conductive material for extending the influence of an electrical potential therethrough;
   e. an array of electrodes disposed in a common plane and in a spaced apart relationship to said first surface of said assembly;
   f. each of said electrodes being adjacent, and thereby related to, the light admitting ends of a predetermined segment of said array of light guides;
   g. light controlling material means sandwiched between said first surface of said assembly and said array of electrodes; and
   h. means for applying the influence of an electrical potential between the electrically conductive material of said assembly and one, or more, of said electrodes and thereby extend said influence across those portions of said light controlling material means adjacent the light admitting ends of the segments of said array that are related to said one, or more, of said electrodes.

2. The invention as set forth in claim 1 additionally including:
   i. said light controlling material means emitting light therefrom upon said applying of the influence of an electrical potential between said electrically conductive material and said one, or more, of said electrodes.

3. The invention as set forth in claim 1 additionally including:
   i. said light controlling material means permitting the passage of light therethrough upon said applying of the influence of an electrical potential between said electrically conductive material and said one, or more, of said electrodes.

4. A light guide assembly including:
a. a collimated array of light guides presenting light admitting ends coincident with a first surface of said assembly and light emitting ends coincident with a second surface of said assembly, said first and second surfaces being substantially parallel to each other and substantially perpendicular to said collimated array of light guides;
b. said array of light guides presenting light emitting ends representing character forming segments of a predetermined number of message characters and each said segment includes a plurality of light guides wherein each light guide is spaced a predetermined distance from an adjacent light guide therein; and
c. said light admitting ends and said light emitting ends each comprising alike arrays of character forming segments;
d. said assembly contains a moulding compound for supporting said array of light guides therein;
e. an array of electrodes disposed in a common plane and in a spaced apart relationship to said first surface of said assembly;
f. each of said electrodes being adjacent, and thereby related to, the light admitting ends of a predetermined segment of said array of light guides;
g. a layer of light transparent electrically conducting material adjacent said first surface;
h. light controlling material means sandwiched between said layer and said array of electrodes; and
i. means for applying the influence of an electrical potential between said layer and one, or more, of said electrodes and thereby extend said influence across those portions of said light controlling material means adjacent the light admitting ends of the segments of said array that are related to said one, or more, of said electrodes.

5. The invention as set forth in claim 4 additionally including:
j. said light controlling material means permitting the passage of light therethrough upon said applying of the influence of an electrical potential between said layer and said one, or more, of said electrodes.

6. A light guide message character forming means comprising:
a. a plurality of light guides each presenting a first end coincident with a first surface of said means, a second end coincident with a second surface of said means, a longitudinal dimension extending from said first end to said second end and a substantially uniform cross-sectional dimension along said longitudinal dimension from said first end to said second end;
b. said first ends arranged in fixedly supported predetermined spaced positions within a predetermined size message character light admitting area of said first surface so as to represent an array of light admitting message character forming segments, each said segment including a plurality of said first ends;
c. said second ends arranged in fixedly supported predetermined spaced positions within a predetermined size message character light emitting area of said second surface so as to represent an array of light emitting message character forming segments, each said segment including a plurality of said second ends;
d. said predetermined spaced positions of said first ends, said predetermined size area of said first surface, and said array of light admitting message character forming segments correspond, respectively, to said predetermined spaced positions of said second ends, said predetermined size area of said second surface, and said array of light emitting message character forming segments;
e. said plurality of light guides extend from said first surface to said second surface along straight parallel paths, along which said light guides are fixedly supported, the respective positions of said light guides and the space between said light guides along said longitudinal dimension remaining constant between said first and second surfaces and thereby correspond to said predetermined spaced positions of said first and second ends thereof.

7. A light guide message character forming means comprising:
a. a plurality of light guides each presenting a first end coincident with a first surface of said means, a second end coincident with a second surface of said means, a longitudinal dimension extending from said first end to said second end and a substantially uniform cross-sectional dimension along said longitudinal dimension from said first to said second end;
b. said first ends arranged in fixedly supported predetermined spaced positions within a predetermined size message character light admitting area of said first surface so as to represent an array of light admitting message character forming segments, each said segment including a plurality of said first ends;
c. said second ends arranged in fixedly supported predetermined spaced positions within a predetermined size message character light emitting area of said second surface so as to represent an array of light emitting message character forming segments, each said segment including a plurality of said second ends;
d. said predetermined spaced positions of said first ends, said predetermined size area of said first surface, and said array of light admitting message character forming segments correspond, respectively, to said predetermined spaced positions of said second ends, said predetermined size area of said second surface, and said array of light emitting message character forming segments;
e. a plurality of electrically controllable light controlling material means supported adjacent said first surface, each said light controlling material means being adjacent and fixedly related to a predetermined number and arrangement of said first ends, each said number and arrangement of first ends being a message character forming segment of said array of segments;
f. said plurality of light guides extend from said first surface to said second surface along straight parallel paths, along which said light guides are fixedly supported, the respective positions of said light guides and the spacing between said light guides along said longitudinal dimension remaining substantially constant between said first and second surfaces and thereby correspond to said predetermined spaced positions of said first and of said second ends thereof;
g. electrode means for extending the influence of an electrical potential, selectively, across each of said light controlling material means for controlling the admission of light to one, or a number, of said light admitting message character forming segments.